D. HAINES.
HOMINY MACHINE.
No. 32,516. Patented June 11, 1861.
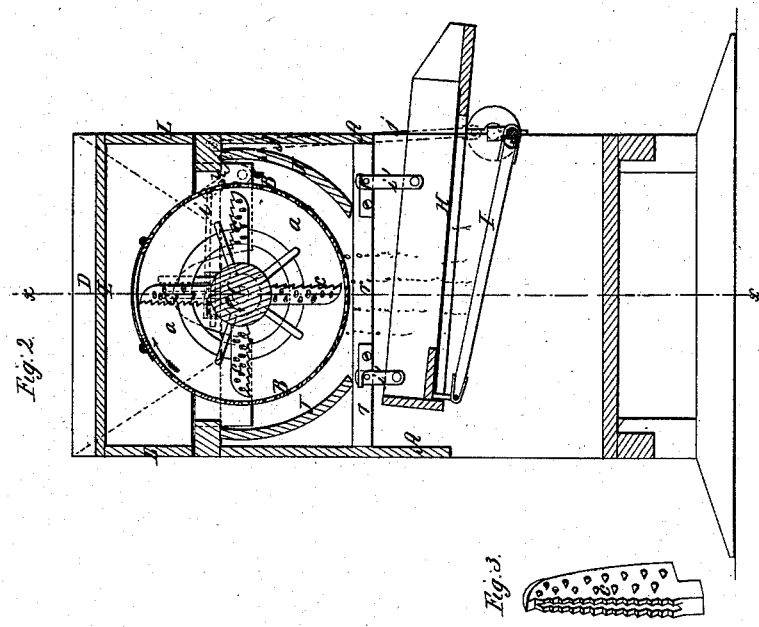
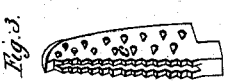
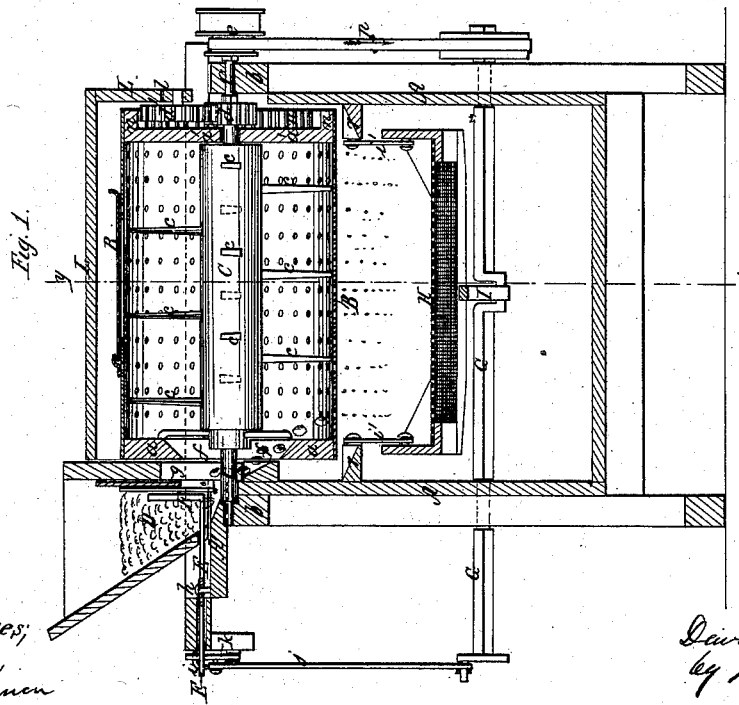

UNITED STATES PATENT OFFICE.

DAVID HAINES, OF UNION BRIDGE, MARYLAND.

HOMINY-MACHINE.

Specification of Letters Patent No. 32,516, dated June 11, 1861.

*To all whom it may concern:*

Be it known that I, DAVID HAINES, of Union Bridge, in the county of Carroll and State of Maryland, have invented a new and Improved Hominy-Machine; and I do hereby declare that the following is a full, clear, and exact description thereof, reference being had to the accompanying drawings, making a part of this specification, in which—

Figure 1 is a longitudinal section through the improved machine, taken in the vertical plane indicated by red line $x, x$, in Fig. 2. Fig. 2 is a transverse section through Fig. 1 in the vertical plane indicated by the red line $y, y$, therein. Fig. 3 is a perspective view of one of the beating teeth used in Figs. 1 and 2.

Similar letters of reference indicate corresponding parts in the three figures.

This invention relates to certain novel improvements in machines for making hominy and cleaning the same of its bran and other impurities.

The nature of my invention consists in the arrangement of a vibrating stirrer within the hopper for keeping up a regular feed, said stirrer being combined with, and operated by, the crank shaft, which gives the shaking motion to the riddle as will be hereinafter described.

To enable those skilled in the art to make and use my invention I will proceed to describe its construction and operation.

A. represents the framework of the machine which is constructed in a strong and substantial manner to contain and support the mechanism for cracking the corn and screening the hominy.

B. is a cylinder of a suitable diameter and length which is made of sheet metal filled with small perforations, the ends of which cylinder have heads $a, a'$, in them to prevent the corn from escaping at these points. This cylinder B. has its axial bearings on a shaft C. which passes through the cylinder and has its end bearings on transverse bars $b, b'$, of the frame A. That portion of shaft C. which is between the heads $a, a'$, is greatly enlarged and a number of long teeth $c, c, c, c$, are secured to it, which radiate from its center and project from its surface so as not to quite touch the inner surface of cylinder B. These teeth $c, c$, each, consist of a thick blade tapering toward its outer end, one edge of each tooth is serrated as represented in Fig. 3 of the drawings, and a double set of saw-shaped teeth are formed. The sides of the teeth $c$, have sharp burs formed on them by punching up the metal with a chisel. On one end of shaft C. a pinion spur wheel $d$, is keyed and on the extreme end of this shaft C. a cone pulley $e$, is secured. The opposite end of shaft C. passes through a large hole $f$, through head $a$, of cylinder B. through which opening ($f$,) the corn is passed into the cylinder B. from a hopper D. shown clearly in Fig. 1, of the drawings. This hopper D. has a sliding gate $g$, in it for regulating the size of the opening through which the corn escapes from the hopper.

E. is a rod having its end which is in the hopper D. turned up, as shown in Fig. 1. This rod is pivoted to the horizontal board A'. at $h$, and it receives a horizontal vibrating motion from the crank shaft G. through connecting rods $i$, and $j$, and vibrating arm $k$, shown in Fig. 1. This vibrating motion of rod E. keeps the throat of the hopper open, and prevents the corn from clogging it up.

The pinion spur wheel $d$, engages with a corresponding wheel $d'$, which has its bearings in a transverse bar $l$, and the pinion $d'$, engages with the inside gearing $n$, which is secured to the end $a'$, of cylinder B. as shown in Fig. 1, and which is concentric with the axis of cylinder B. The shaft C. will thus transmit a rotary motion to the cylinder B. through the wheels $d, d'$, and the annular spurred gearing $n$, and the cylinder B. will be rotated in an opposite direction to shaft C. but not as rapidly as this shaft. The shaft C. receives its rotary motion from crank shaft G. through the medium of belt $p$, and the crank shaft may receive its motion from any convenient prime mover. This crank shaft G. is arranged in a horizontal position along one side of the machine and under the lower edge of inclined screen H. and in the middle of shaft G. a bell crank is formed on it which gives a vibrating motion to screen or riddle H. through a connecting rod I. Fig. 2, which is pivoted at one end to the crank on shaft G, and at the other end to the back part of screen H. Screen H. is hung by the pivoted straps $i', i', i', i'$, from bracket pieces $r, r$, under the cylinder B. so as to catch all the cracked corn or hominy falling from cylinder B.

The two longitudinal curved boards J. J.

which extend along on each side of and under the cylinder B. conduct the cracked corn flying from this cylinder down, and on the screen H.; and over the cylinder B. a close box L. is arranged which also prevents the hominy from escaping from the top of the machine. Thus all the hominy which escapes from cylinder B. will be deposited on the screen H. below the cylinder before it escapes from the machine.

The operation of the entire machine is as follows: Motion is given to crank shaft G. which communicates motion to the shaft C. through belt $p$, and shaft C. transmits motion to cylinder B. through spur gearing $d$, $d'$, and $n$. The vibrating stirring arm E. also receives its motion from shaft G. through the arm and connecting rods as before described. The machine being put in operation the corn, which has been soaked in water to soften it, is put into the hopper D. and from this hopper it flows steadily into the cylinder B. through the hole $f$, in the cylinder head $a$, shown in Fig. 1 of the drawings. Immediately the corn passes into the cylinder B. it is rapidly beaten and rubbed by the serrated teeth $c$, which not only crack the grains but rub off the shells which inclose them, and this cracking and rubbing operation goes on until the particles are reduced to the desired degree of fineness, when they will pass through the perforations in cylinder B. and fall on riddle H. leaving a great proportion of the bran or hulls in the cylinder B. to be removed when the machine is stopped. The riddle H. screens all the fine particles from the coarser leaving the pure hominy to pass over this riddle into a proper receptacle to receive it.

Having thus described my invention what I claim as new and desire to secure by Letters Patent is—

The hopper D, arranged as set forth, the vibrating stirrer E, connecting rods $i$, $j$, arm $k$, and crank shaft G, all arranged and operating as and for the purposes herein described.

DAVID HAINES.

Witnesses:
MARTIN E. SAYLOR,
GEORGE W. STERN.